(12) United States Patent
Bollhoefer

(10) Patent No.: US 7,495,655 B2
(45) Date of Patent: Feb. 24, 2009

(54) CONTROL DEVICE

(75) Inventor: Wilhelm Bollhoefer, Ruelzheim (DE)

(73) Assignee: Siemens Aktiengesellschaft, Munich (DE)

( * ) Notice: Subject to any disclaimer, the term of this patent is extended or adjusted under 35 U.S.C. 154(b) by 66 days.

(21) Appl. No.: 10/835,469

(22) Filed: Apr. 30, 2004

(65) Prior Publication Data

US 2005/0052345 A1    Mar. 10, 2005

Related U.S. Application Data

(63) Continuation of application No. PCT/DE02/04038, filed on Oct. 29, 2002.

(30) Foreign Application Priority Data

Oct. 31, 2001    (DE)    ............. 201 17 645 U

(51) Int. Cl.
G09G 5/08    (2006.01)
G06F 3/033    (2006.01)

(52) U.S. Cl. ............. 345/158; 345/9; 345/157; 345/183

(58) Field of Classification Search ......... 345/156–159, 345/179–183, 9, 207; 353/42; 178/18.01, 178/18.02, 18.09, 19.01, 19.05
See application file for complete search history.

(56) References Cited

U.S. PATENT DOCUMENTS

| | | | |
|---|---|---|---|
| 4,782,328 A | | 11/1988 | Denlinger |
| 5,115,230 A | * | 5/1992 | Smoot ............. 345/157 |
| 5,448,261 A | | 9/1995 | Koike et al. |
| 5,644,126 A | | 7/1997 | Ogawa |
| 5,867,146 A | | 2/1999 | Kim et al. |
| 5,952,996 A | | 9/1999 | Kim et al. |
| 6,043,805 A | | 3/2000 | Hsieh |
| 6,133,907 A | * | 10/2000 | Liu ............. 345/183 |
| 6,727,885 B1 | * | 4/2004 | Ishino et al. ............. 345/156 |
| 6,803,907 B2 | * | 10/2004 | Chen ............. 345/182 |
| 2001/0010514 A1 | | 8/2001 | Ishino | |

FOREIGN PATENT DOCUMENTS

DE    43 36 677 C1    3/1995

(Continued)

OTHER PUBLICATIONS

Chinese Patent Application No. 02821629.6, English translation of Rejection Decision issued by Chinese Patent Office, dated Apr. 29, 2004.

*Primary Examiner*—Kevin M Nguyen
(74) *Attorney, Agent, or Firm*—Sughrue Mion, PLLC

(57) ABSTRACT

A control device includes a mobile control member (F) for emitting a diffuse light beam (LS). An electronic processing unit (V) generates a graphic user interface (VA) and is advantageously connected, via a data link (K1, K2), to a display unit (D, VD). The display unit (D, VD) displays the graphic user interfaces (VA). An optical receiver sensor (S) converts movement directions (B) of the diffuse light beam (LS) of the mobile control member (F) into a control signal. In the processing unit (V), the control signal effects, in accordance with the movements of the diffuse light beam (LS), tracking of a graphic control marker (C) and/or of the position of the graphic user interface (VA) and/or of parts of the interface (VA) and/or of visual elements (C) in the interface (VA).

30 Claims, 2 Drawing Sheets

FOREIGN PATENT DOCUMENTS

| | | |
|---|---|---|
| DE | 197 01 994 A1 | 1/1997 |
| DE | 197 57 674 A1 | 7/1998 |
| DE | 198 80 483 C1 | 3/2000 |
| DE | 198 61 129 A1 | 5/2000 |
| EP | 0 484 160 A2 | 5/1992 |
| EP | 0 721 169 A2 | 7/1996 |
| EP | 0 753 760 A2 | 1/1997 |
| WO | WO 9603736 A1 | 2/1996 |

* cited by examiner

CONTROL DEVICE

This is a Continuation of International Application PCT/DE02/04038, with an international filing date of Oct. 29, 2002, which was published under PCT Article 21(2) in German, and the disclosure of which is incorporated into this application by reference.

FIELD OF AND BACKGROUND OF THE INVENTION

In image and data processing, various devices are known to effect positioning of objects on a graphic user interface. These objects are visualized on a display unit, e.g., a monitor, a large display panel or an LCD display. In practice, standard input devices are employed, e.g., keyboards equipped with a special keypad for effecting positioning, computer mice or input devices with a track ball. Other input devices of this type include joysticks, i.e., a lever-type operating element, or digitizing tablets.

A wide variety of forms of positioning are found in practice. On the one hand, the graphic user interface itself, a part thereof or, e.g., a greatly enlarged portion thereof, can be shifted on the display unit. This often occurs if the total displayable area is larger than the display area of the display unit. Furthermore, when a computer system is used, for example, it is constantly necessary to reposition graphic control markers. These markers are often referred to as cursors, insertion markers or mouse pointers and indicate the location where a change is to be made, e.g., by initiating a data input.

In the aforementioned input devices, electrical control signals are generated to mechanically effect position changes, e.g., by actuating keys or by scanning a rolling motion in XY direction. The control signals are transmitted to a processing unit, which thereby effects a position change, e.g., of a cursor on the display unit. This functionality requires the respective input device to be registered and activated, via system means, at the processing unit.

Furthermore, the user must at least get used to the movements at, or with, such an input device being spatially decoupled from the position changes that the device causes on the display unit. For example, a PC mouse is moved on a surface, whereas an associated position change occurs on a monitor. As a rule, the input device to be operated and the display unit are not simultaneously in the user's field of view.

German Patent DE 198 80 483 discloses an input device for a computer. Furthermore, German Patent DE 198 611 29 relates to a corresponding method for performing adjustments by means of an input device for a computer that has a graphic user interface.

Therein, the user interface of an application program running on a computer is displayed on a monitor and, in addition, projected onto a display area, e.g., a projection screen, by means of a projector. Thereby, several persons can view its content. With the aid of transmitters in the form of laser pointers, focused light beams can be directed at the display area. The respectively occurring light spots simulate a mouse pointer, and controllable contents of the graphic user interface displayed on the projection area can be activated at this location.

For activation, an image pickup device including a CCD sensor with an optics system, whose detection area includes at least the entire projection screen, is placed behind the projection screen. A control circuit detects the precise XY position of an incident light spot by a line and column analysis of the CCD sensor. Thereby, an electronic signal is generated, which is transmitted to the computer and which is characteristic for the location where the beam strikes the projection screen in the detection area and/or for the distance and direction of movement of the incident light spot. This simulates asynchronous mouse pointer positioning events and makes it possible to activate objects in the detection area.

This kind of mouse pointer simulation, however, has the drawback that a light spot itself, with the detection of its position on the projection screen and with an assignment to the controllable objects of a graphic user interface projected thereon, takes on the characteristic of an independent cursor. This cursor is not synchronous with the cursor that is displayed on the monitor of the associated computer and that is administered, for example, by means of a computer mouse. As a result, actions initiated by different cursors can affect the application program executed on the computer. For safety reasons, such a device cannot be used in an industrial environment, e.g., in a control room of a production line.

A further drawback of the devices disclosed in German patents DE 198 80 483 and DE 198 61 129 is that they require an image pickup device with a detection area that covers the display area, e.g., a large screen, completely. For this purpose, the image pickup device may have to be arranged at a substantial distance in front of or behind the projection screen and the light spots to be detected thereon. Since the XY coordinate position of a light spot and its movement is absolutely detected with respect to the dimensions of the detection area, the image pickup device must furthermore be calibrated relative to the projection screen. After this calibration, the image pickup device may no longer be shifted.

A further drawback is that the surface of the projection screen must reflect the incident light spot, since, otherwise, navigating and positioning by a user would not be possible. However, for screens, a reflection on the surface is not desirable. The device disclosed in German Patents DE 198 80 483 and DE 198 61 129 is therefore suitable, for example, as the display area in the case of a projection screen, but not in the case of a thin film transistor (TFT) display. Furthermore, the transmitter must generate a sharp, readily visible light spot to enable positioning by an operator. Therein, in particular in the case of large screens, laser radiation will have to be used in the transmitter. This, however, requires compliance with safety regulations.

German Patents DE 43 36 677 and DE 197 57 674 disclose input devices for positioning an object on a graphic surface. Therein, the position of a light spot in space is detected and the movement of this light spot is converted into a corresponding movement of the object.

The arrangement described in German Patent DE 43 36 677 is employed for determining a spatial position and for inputting control information into a system having a graphic user interface. Therein, the arrangement is equipped with at least one input device having a light source that is operated by a user, a camera arranged adjacent to the user interface of the system, and an acceleration sensor in the input device for detecting accelerations axially to the user interface. The arrangement makes it possible to determine the local position of the input device in order to control a cursor on the user interface. Employment of the acceleration sensor makes it possible not only to detect a movement perpendicular to the surface but also to signal user actions to the camera, e.g., the selection of objects or state changes in the program.

German Patent DE 197 57 674 discloses an arrangement for position detection and remote control. The object of this arrangement is to remote-control the position of a cursor, which is displayed on the display screen of a receiver, by two-dimensional or three-dimensional positioning of a transmitter. A further object of the known arrangement is to select a function by actuating an ON/OFF switch on the transmitter. The light emitted from a light source block of a transmitter is emitted via a first optical block. A receiver receives the light from the transmitter via a second optical block in a sensor block. A detection block detects the light intensity as a function of the output signal of the sensor block. A control block calculates the two-dimensional or three-dimensional position of the transmitter and displays this position as a cursor position on the display screen.

The input devices disclosed in the German Patents DE 43 36 677 and DE 197 57 674 have the drawback that a light source that generates the light spot must be moved substantially before the movement of the light spot can be detected. For a handheld light source, this usually requires the entire arm to be moved. A movement of the light source "from the wrist" is not possible.

OBJECTS OF THE INVENTION

It is an object of the invention to provide an input device with which a user can change the positions of elements, particularly the position of a cursor, on a graphic user interface and initiate actions in a particularly simple manner.

SUMMARY OF THE INVENTION

According to one formulation of the invention, this and other objects are achieved by a control device for a display panel, which includes a mobile control unit that has an emitter for emitting a diffuse light beam. An electronic processing unit, which has at least one data link, generates at least one graphic user interface, e.g., of an application program. At least one display unit connected to a data link of the processing unit visualizes graphic user interfaces. An optical receiving sensor is connected to the data link of the processing unit and converts movement directions of the diffuse light beam of the mobile control unit into a control signal. After transmission via the data link, the control signal effects, in the processing unit, tracking of the position of the graphic user interface and/or parts thereof and/or visual elements therein, in accordance with the movements of the diffuse light beam.

In the present invention, a "diffuse light beam" is, for example, a conical light emission whose projected image has the most finely distributed intensity fluctuations possible in an area of a plane. The intensity fluctuations can have a fine "structure" comparable to a fabric pattern. However, the intensity fluctuations may also be freely distributed. The projected image has, for example, a free distribution of light and dark areas of any shape. For example, the "diffuse light beam" is effected by an irregular diffusion of a light source, e.g., by means of a diffusing screen. The surface of the diffusing screen can be coated in various ways, e.g., by applying a semi-transparent coating, an irregular coating, etc., or may be roughened by surface grinding. Thus, the projected image of the "diffuse light beam" should have some kind of "marbled" structure and be able to cover the respective graphic user interface over the largest possible area.

A control device according to the present invention has the special advantage that it requires no defined spatial assignment of the mobile optical receiving sensor in relation to the size of the display area of the display unit. In particular, it is not necessary to comply with any depth clearance between the display unit and the receiving sensor. As a result, the receiving sensor can be placed at any location within the dispersion range of the light beam of the mobile control unit, e.g., directly underneath a projection screen that is used as the display unit, or on top of the housing of a monitor that is used as the display unit. Thus, fundamentally, the receiving sensor can be arranged in the same plane with, in front of, adjacent to or above the display unit.

Furthermore, the present invention does not require any calibration of the receiving sensor in relation to the spatial position of the display unit because the position changes of the user interface or of visual elements on the user interface are effected relative to the original position of the shifted object. Thus, the mobile optical receiving sensor can be moved at any time and set up at a different location.

Furthermore, the present invention does not require a reflection of the light beam, e.g., for orientation and visual feedback of the selected position for a user. Rather, the object undergoing the position change itself serves as a visual marker.

This is particularly advantageous if the object that is exposed to a position change is a cursor or a screen marker/insertion marker. The actual, already positioned system cursor is the visual marker. This prevents inputting errors with respect to the cursor's position because the computer itself determines the position. In addition, the speed of the cursor movement can be monitored and evaluated by the computer. Since, according to the invention, the actual system cursor is quasi-tracked, the optical control unit used can also emit non-visible light, e.g., infrared radiation. Furthermore, the present invention does not require a light spot with a small area, i.e., a sharply focused light spot, so that a laser beam, which can be hazardous to persons, is not necessarily required.

BRIEF DESCRIPTION OF THE DRAWINGS

The invention will now be described in greater detail with reference to preferred embodiments depicted in the figures, in which.

DETAILED DESCRIPTION OF THE PREFERRED EMBODIMENTS

Figure 1:
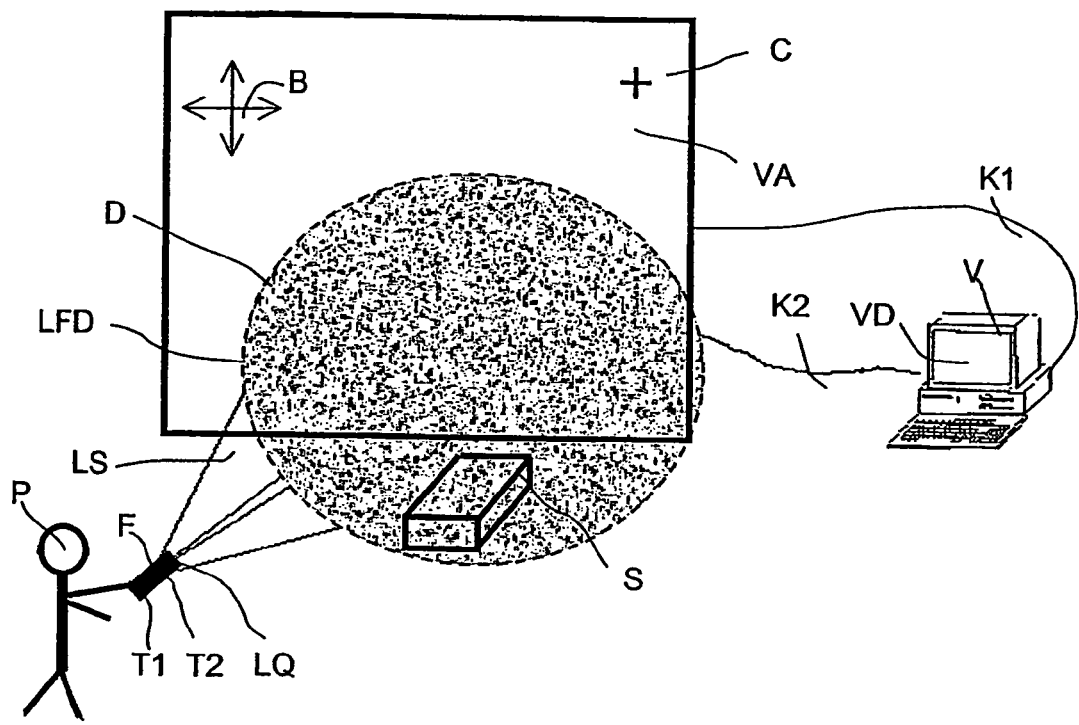
FIG. 1 shows an advantageous embodiment of the invention in which the light source of the optical control unit of the invention emits a "diffuse light beam" and the optical receiving sensor is, for example, arranged under a large display unit.

FIG. 1 shows an advantageous embodiment of the invention in which a light source LQ of an optical control unit F emits a diffuse light beam LS. The projected image of the diffuse light beam represents, for example, an inhomogeneous light field LFD in the plane of a large display unit D. This light field is at least large enough that it covers an optical receiving sensor S, which is placed, for example, underneath the display unit D, e.g., a large screen.

The control device according to the invention has an electronic processing unit V, which generates at least graphic user interfaces of, e.g., application programs, and, if needed, freely positionable graphic control markers that are generated by data means. In the exemplary embodiment of FIG. 1, a graphic user interface VA and a cursor-type control marker C are generated and output on both the display panel D and a local monitor VD of the processing unit V. Therein, the processing unit V is connected with the display unit D, preferably via a bus-type data link K1. The mobile optical receiving sensor S is connected to the processing unit V via an additional data link K2. The links K1, K2 may also be combined into a common bus line.

In the exemplary embodiment of FIG. 1, a person P handles the mobile control unit F of the control device according to the invention. By pressing a button T1, the person P activates the light source LQ on the end face of the control unit F and thereby triggers the emission of the diffuse light beam LS. The light beam LS is directed at a large area display panel, which is used as the display unit D. The diffuse light beam LS generates an inhomogeneous light field LFD, which has a preferably fine-dotted distribution of light and dark areas, as a projected image onto the surface of the display panel. By appropriately rotating the control unit F, the inhomogeneous light field can be shifted in selected spatial directions B. According to the invention, this makes it possible to track display contents VA on the display panel D in the same spatial direction.

This will now be described in greater detail with reference to the example of positioning a graphic control marker C, in particular a cursor or a mouse pointer. Therein, the operator or person P uses the control unit F to point in the direction of the screen D. After depressing and holding the button T1, the cursor C is moved accordingly on the screen D. If the person P moves the control toward the right, the cursor C moves toward the right on the screen D. If the person P moves the control unit F downward, the cursor C also moves downward on the screen D. When the desired position is reached, the button T1 is released. The operator P can use additional buttons T2 for inputs. The arrangement of the buttons T1, T2 and the activated input possibilities actuated thereby can be configured in such a way that they are, for the most part, comparable to the buttons of a computer mouse and correspond to the assignment of the right and the left mouse buttons.

Preferably, to achieve the above-described functionality, the control device according to the invention has a mobile optical receiving sensor S, which is placed in spatial proximity of the display unit D. In the exemplary embodiment of FIG. 1, the optical receiving sensor S is arranged underneath the display panel D. No special spatial relationship between the display unit D and the optical receiving sensor S is required for the invention. Thus, the receiving sensor S is advantageously placed in the expected viewing direction of an operator. This expected viewing direction will typically, but not necessarily, coincide with the direction in which the operator views the display unit.

The optical receiving sensor S evaluates the movement directions B of the diffuse light beam LS of the mobile control unit F and the inhomogeneous pattern of the light field LFD produced thereby and converts the moving directions into a control signal. The control signal is transmitted to the processing unit V via the data bus connection K1, K2. The processing unit V, in turn, causes tracking of the position of the display contents on the display panel, i.e., a graphic user interface and/or parts thereof and/or visual elements contained therein, e.g., the cursor C, in accordance with the movements of the diffuse light beam LS.

In the exemplary embodiment of FIG. 1, the optical receiving sensor S could also be mounted on the housing of the local monitor VD of the electronic processing unit V. If the operator P were to direct the control unit F at the monitor, the above-described change in position could be executed in the same manner. This is particularly advantageous if, depending on the respective situation, the current viewing direction of the operator is primarily in the direction to the monitor VD.

A particular advantage of the control device according to the invention is that the mobile control unit does not have to be connected, via system means, with the display unit that is to be controlled or operated. Neither a direct data link nor a logic registration of the mobile control unit with the processing unit is required, e.g., in terms of operating equipment. Rather, according to the invention, a mobile control unit can control any type of display units, provided that the display units are equipped with a corresponding optical receiving sensor. In a simple application, a commercially available "laser pointing device", which is equipped with a respective diffusing disk, is used as a mobile control unit. Advantageously, the mobile control unit of the control device according to the invention is a handheld device, in particular a remote control. This enables a user "to point" in the direction of the associated display unit. Therein, in the simplest case, any radiation source whose projected light cone has distributed surface-area intensity fluctuations can be used, e.g., a flashlight with a corresponding reflector or a diffusing screen.

Unlike the conventional standard input devices, the control device according to the invention has the particular advantage of ergonomic operation. In practice, operators particularly appreciate a mobile control unit, e.g., in the form of a handheld device that can be pointed at a screen on which, directly, visible changes can be made, in particular cursor position changes. To point and move with a device like a remote control is easier than to enter position changes with a mouse, a keyboard or a joystick. It is a special characteristic of the control device according to the invention that its mobile control unit does not need to be specifically pointed at certain parts in a graphic user interface. Rather, a merely approximate alignment of the mobile control unit in the direction of the optical receiving sensor is sufficient. This further enhances the ease of operation.

A further advantage of the control device according to the invention is that no mechanical parts are required, such as, for example, a track ball, keyboard or mouse. Furthermore, no base is required, e.g., a tabletop, mouse pad or digitizing tablet.

Figure 2:
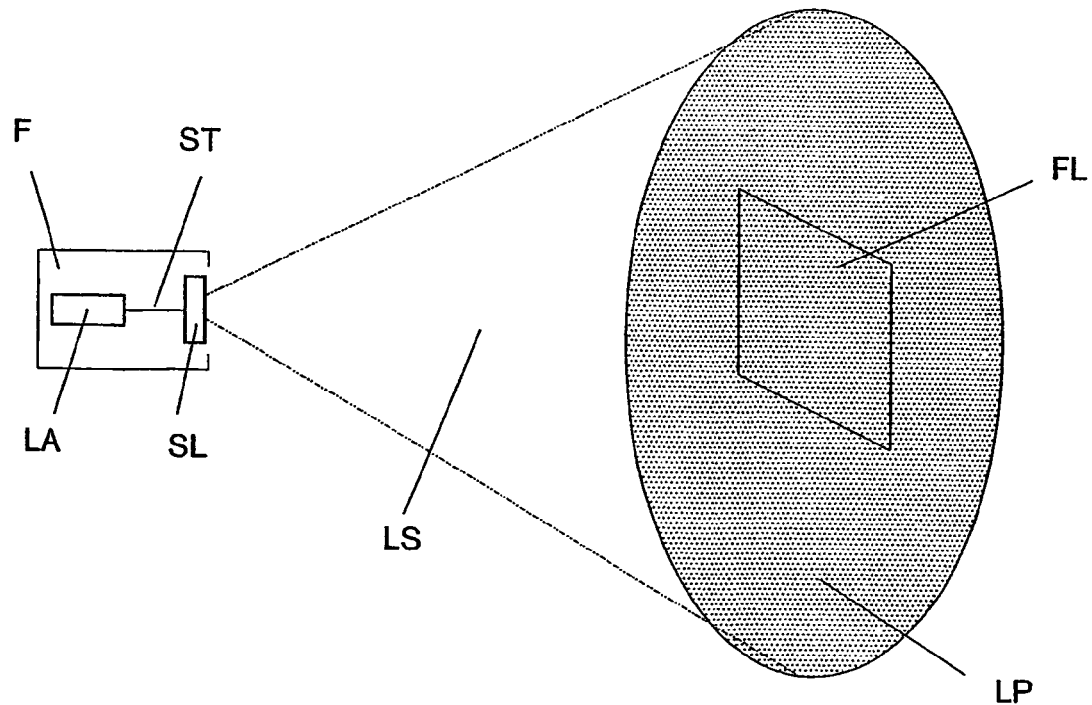
FIG. 2 shows a second advantageous embodiment of the invention in which the diffuse light beam is generated by diffusion of a laser beam.

FIG. 2 shows another advantageous embodiment of the invention, wherein a laser SL generates a diffuse light beam LS and a resulting projected image LP in the form of a "diffuse light field". Therein, the laser generates the laser beam LS, which generates, e.g., a type of "spot pattern" on a projection area FL by means of an associated diffusing lens SL. The resulting projection of a light source LA in the control unit F is reproduced as a light spot pattern on an interior surface. If the control unit F and, thus, the light source LA are moved, the light spot pattern also moves. A light-sensitive surface in the receiving sensor S, e.g., a CCD image sensor or a lateral effect diode, can evaluate the movement direction of the light spot pattern and calculate a corresponding control signal for tracking a cursor C.

Figure 3:
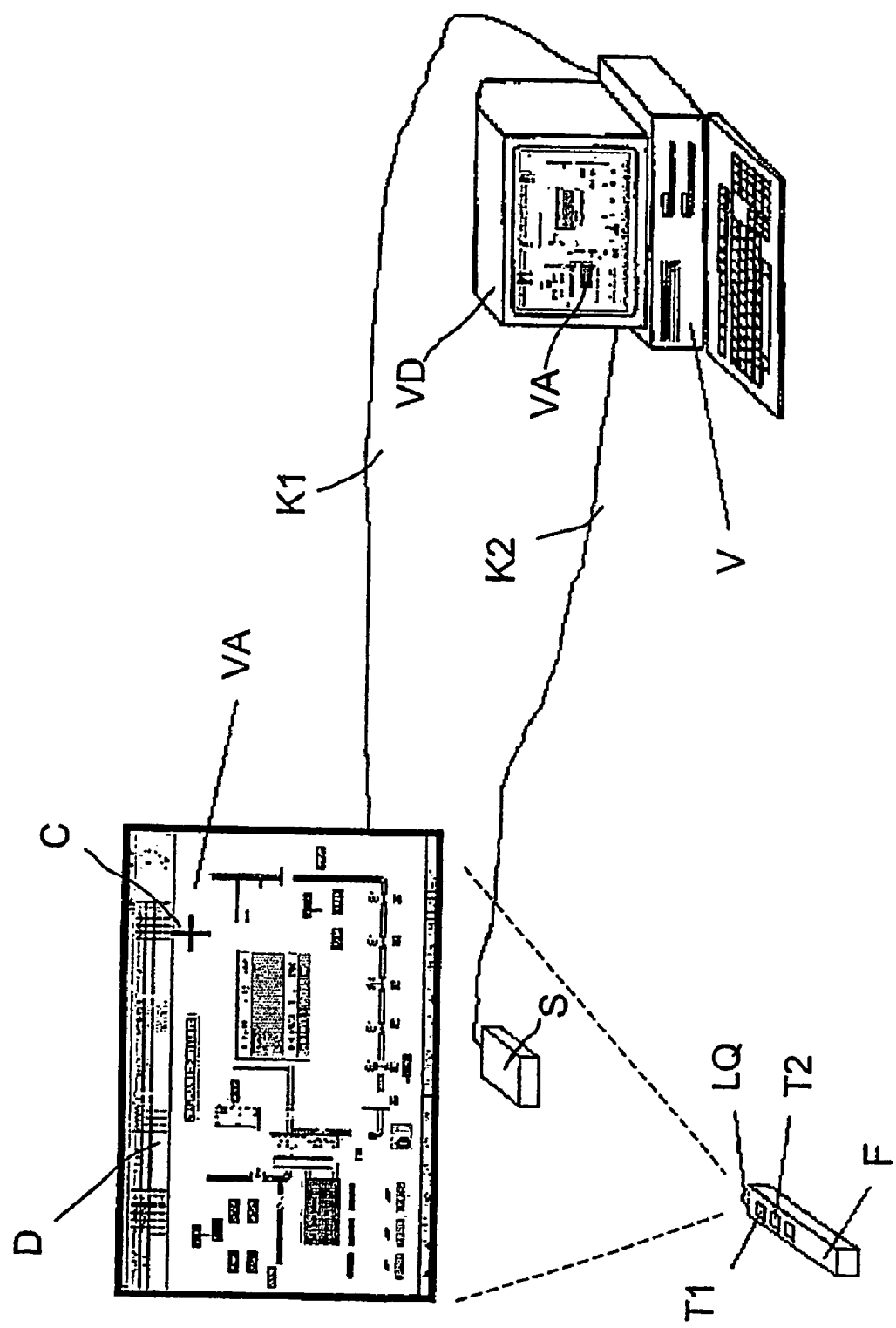
FIG. 3 shows an advantageous application of the invention in which a controllable process image of a technical installation is output on the display unit and the optical control unit enables not only positioning of the control marker but also activating functions in the process image.

FIG. 3 illustrates an advantageous application of the invention, wherein a controllable process image of, e.g., a technical installation, is output on the display unit, and wherein the optical control device enables not only positioning a control marker but also activating functions in the process image.

Increasingly, technical installations are operated by means of digital, programmable devices, which often times also constitute an automation system or a component thereof. The term "technical installations" includes all types of technical equipment and systems both in an individual arrangement and in a data-networked arrangement, e.g., via a field bus. Thus, the term "technical installations", e.g., in the context of an industrial application, includes individual apparatuses or operating equipment, such as drives or machine tools. However, a technical installation can also be an entire production plant, in which, if necessary, locally distributed apparatuses and/or operating equipment perform an entire technical process, e.g., in a chemical plant, an assembly plant or a processing plant.

The programmable devices for managing technical installations are generally referred to as HMI devices, which is short for "Human Machine Interface". This class of devices is now often referred as devices for "controlling and monitoring" technical installations or as "C+M devices" for short. These devices, which are often placed upstream of the devices that are actually used to control a technical installation, have an increasingly broad functionality. The term "HMI device" is a generic term and includes all components belonging to this group of devices, e.g., operator panels or "OP" for short. HMI devices perform an increasing number of functions, e.g., in a networked automation system, which can generally be described as pre-processing and post-processing data of the technical installation to be controlled. This relieves an additional central control device, e.g., a stored program controller. Additionally, an HMI device enables functions that significantly improve the ease and quality of operation by an operator, i.e., particularly the overview of the equipment to be operated and the accuracy of the operations.

FIG. 3 shows an exemplary HMI system. Therein, an electronic processing unit V controls a technical plant (not depicted). The processing unit is, for example, a computer V, which executes at least one plant-specific control program. This program generates at least one controllable process image VA, which is output via a monitor VD that is used as a display unit. The processing unit V with the display unit VD is placed, for example, at a central location in a control room of the technical plant. To facilitate operation, the HMI system depicted in FIG. 3 has an additional display unit D. This display unit can be de-centrally arranged at a selected location in the technical plant, e.g., to enable machine operators to locally influence the state of the technical plant. The additional display unit D is, for example, an operator panel, which is connected to the processing unit V via a data link K1 that is preferably configured as a field bus. On the display unit D, the same process image VA is displayed as on the monitor VD. The invention enables a particularly ergonomic operation of the display unit D. In contrast to conventional operator panels, separate control buttons on the display unit may be dispensed with altogether, if necessary. The display unit D can also have a significantly larger display area than conventional operator panels.

To operate the unit, an operator points the optical control device F at the display unit D. Due to its diffusion, the light beam LS emitted therefrom also covers the optical receiving sensor S, which, in the exemplary embodiment of FIG. 3, is arranged underneath the display unit D. The control device F is configured, for example, as a remote control with two function keys T1 and T2. Preferably, the light source LQ has infrared LEDs on its end face.

If an operator presses the function key T1, an infrared light beam LS is emitted by the light source LQ. The receiving sensor S detects the light beam LS and sends a signal "key T1 pressed" to the computer V via the data link K2. A movement of the control device F is also detected by the receiving sensor S and transmitted, for example, as the information "key T1 pressed, cursor moved by delta x/y" to the computer V. The computer V now tracks the cursor C on the display unit D according to the detected relative movement of the control device F.

The accuracy of the positioning and the tracking speed of the cursor C on the display unit D can be made dependent on the speed with which the light beam LQ moves. A slower movement causes a slower and, thus, more accurate positioning of the cursor C, whereas a faster movement causes a faster but less accurate tracking and, thus, positioning of the cursor C. Once the cursor C is tracked in the manner according to the invention until it reaches the desired target position, the operator can release the key T1. As a rule, the cursor C then lies at a point in the process image D where functions can be initiated. To activate these functions, the operator presses the key T2. This also switches on the light source LQ, and, additionally, the information "key T2 pressed" is modulated onto the infrared light beam LS. The computer V can then initiate the associated function. The optical control unit F can also have additional function keys to which, for example, freely programmable actions can be assigned.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A control device for a display panel, comprising:
   a) a mobile control unit having an emitter configured to emit a diffuse light beam;
   wherein the diffuse light beam projects a light field in an area of a plane, and
   wherein the light field has a pattern,
   b) an electronic processing unit configured to data-generate a graphic control marker that is freely positioned in a first graphical user interface of the display panel;
   c) a display unit configured to display a second graphical user interface and the graphic control marker; and
   d) an optical receiving sensor configured to convert movement directions of the pattern of the light field of the diffuse light beam of the mobile control unit into a control signal, wherein, in the processing unit, the control signal effects tracking of the graphical control marker on the display panel in accordance with the movement directions of the diffuse light beam,
   wherein the pattern of the light field projected by the diffuse light beam is inhomogeneous.

2. The control device as claimed in claim 1, wherein the optical receiving sensor is a mobile optical receiving sensor.

3. The control device as claimed in claim 1, wherein the emitter of the mobile control unit is configured to generate a scattered laser beam as the diffuse light beam.

4. The control device as claimed in claim 3, wherein the mobile control unit comprises a laser pointing device having a scatter element.

5. The control device as claimed in claim 1, wherein the mobile control unit comprises a flashlight.

6. The control device as claimed in claim 1, wherein the emitter of the mobile control unit generates an infrared diffuse light beam.

7. The control device as claimed in claim 1, wherein the mobile control unit comprises a handheld device.

8. The control device as claimed in claim 7, wherein the handheld device comprises a remote control.

9. The control device as claimed in claim 1, wherein the graphic marker is controlled in a two dimensional plane.

10. The control device claimed in claim 1, wherein the display panel is larger than the display unit and wherein the first graphical user interface is depicted larger on the display panel than the second graphical user interface on the display unit.

11. The control device as claimed in claim 1, wherein the pattern of the light field projected by the diffuse light beam has finely distributed fluctuations in an area of a plane.

12. A control device as claimed in claim 1, wherein the pattern of the light field projected by the diffuse light beam has a marbled structure.

13. A control device as claimed in claim 1, wherein the projected image of the diffuse light beam is able to cover the respective graphic user interface over a largest possible area.

14. The control device as claimed in claim 1, wherein an optical senor senses the diffuse light beam of the mobile control unit.

15. The control device as claimed in claim 14, wherein the optical sensor directly receives the diffuse light beam.

16. A control device as claimed in claim 1, wherein the pattern of the light field projected by the diffuse light beam is homogeneous.

17. A control device for at least one display panel, comprising
  a) a mobile control unit having an emitter configured to emit a diffuse light beam;
  wherein the diffuse light beam projects a light field in an area of a plane, and
  wherein the light field has a pattern,
  b) an electronic processing unit,
    i) configured to generate at least one graphical user interface for each of the at least one display panel and at least one display unit; and
    ii) having at least one data link;
  c) said at least one display unit,
    i) connected to the data link of the processing unit; and
    ii) configured to display the graphical user interface;
  d) said at least one display panel,
    i) connected to the data link of the processing unit; and
    ii) configured to display the graphical user interface;
  e) an optical receiving sensor,
    i) connected to the data link of the processing unit; and
    ii) configured to convert movement directions of the pattern of the light field of the diffuse light beam of the mobile control unit into a control signal;
  wherein, after transmission via the data link, the control signal, in the processing unit, tracks at least one of i) a position of the graphical user interface on the display panel and ii) parts of the graphical user interface on the display panel, and iii) visual elements located in the graphical user interface on the display panel, in accordance with the movement directions of the diffuse light beam, and
  wherein the pattern of the light field projected by the diffuse light beam is inhomogeneous.

18. The control device as claimed in claim 17, wherein the optical receiving sensor is a mobile optical receiving sensor.

19. The control device as claimed in claim 17, wherein the emitter of the mobile control unit is configured to generate a scattered laser beam as the diffuse light beam.

20. The control device as claimed in claim 19, wherein the mobile control unit comprises a laser pointing device having a scatter element.

21. The control device as claimed in claim 17, wherein the mobile control unit comprises a flashlight.

22. The control device as claimed in claim 17, wherein the emitter of the mobile control unit generates an infrared diffuse light beam.

23. The control device as claimed in claim 17, wherein the mobile control unit comprises a handheld device.

24. The control device as claimed in claim 23, wherein the handheld device comprises a remote control.

25. The control device claimed in claim 17, wherein the visual elements, the parts, or the positions on the graphical user interface are controlled in a two dimensional plane.

26. The control device claimed in claim 17, wherein the display panel is larger than the display unit and wherein the graphical user interface is depicted larger on the display panel than on the display unit.

27. A control device as claimed in claim 17, wherein the pattern of the light field projected by the diffuse light beam has a marbled structure.

28. A control device as claimed in claim 17, wherein the projected image of the diffuse light beam is able to cover the respective graphic user interface over the largest possible area.

29. A control device as claimed in claim 17, wherein the pattern of the light field projected by the diffuse light beam is homogeneous.

30. A control device for a display panel, comprising:
  a) a mobile control unit having an emitter configured to emit a diffuse light beam;
  wherein the diffuse light beam projects a light field in an area of a plane, and wherein the light field has a pattern,
  b) an electronic processing unit configured to data-generate a graphic control marker that is freely positioned in a graphical user interface of the display panel; and
  c) an optical unit configured to receive the diffuse light beam of the mobile control unit and to convert movement directions of the pattern of the light field of the diffuse light beam of the mobile control unit into a control signal,
  wherein, in the processing unit, the control signal effects tracking of the graphical control marker on the display panel in accordance with the movement directions of the diffuse light beam, and
  wherein the pattern of the light field projected by the diffuse light beam is homogeneous.

* * * * *